G. W. FENSTEMAKER.
LOCK NUT.
APPLICATION FILED JUNE 4, 1912.
1,064,629.
Patented June 10, 1913.
2 SHEETS—SHEET 2.
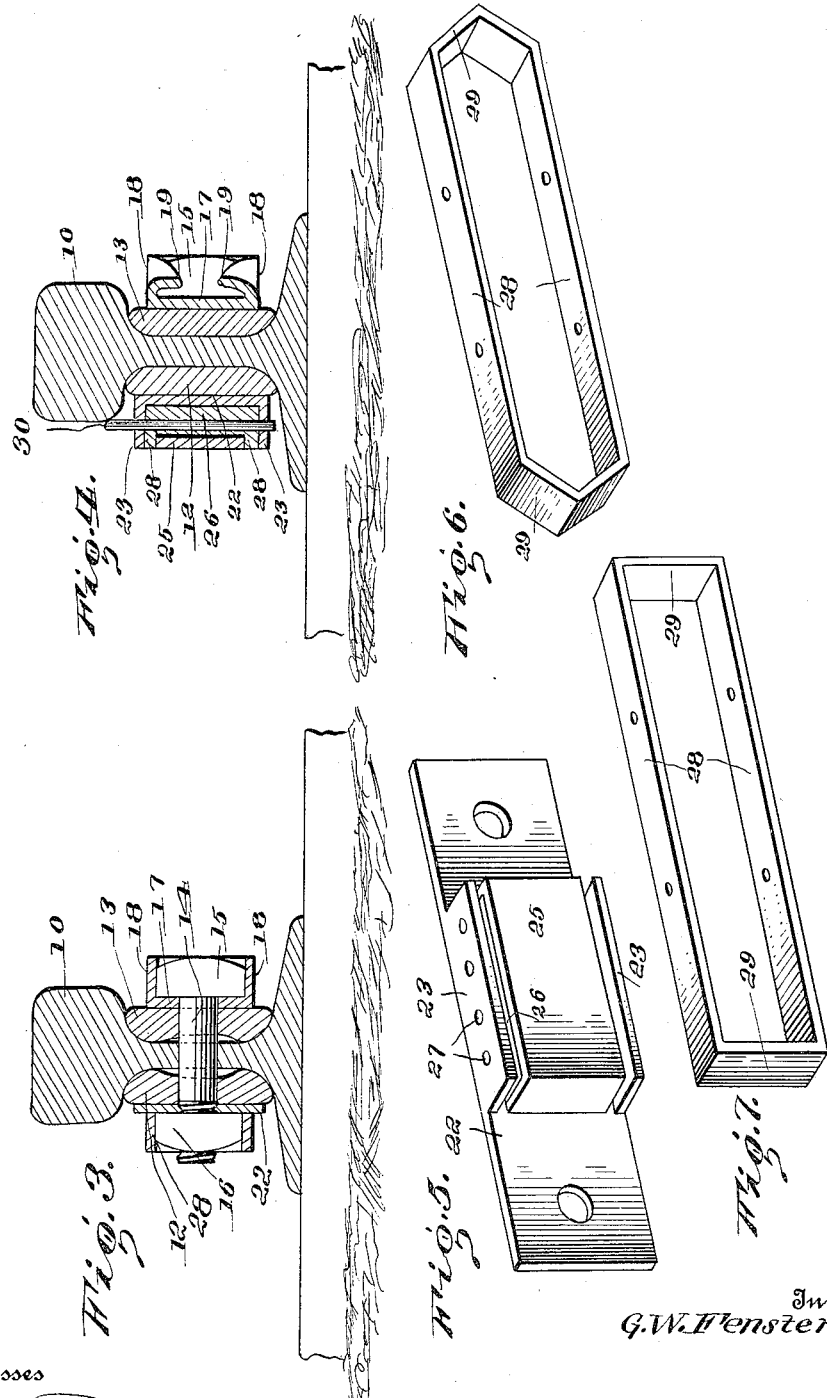
Witnesses
Inventor
G. W. Fenstemaker
By
Attorneys.

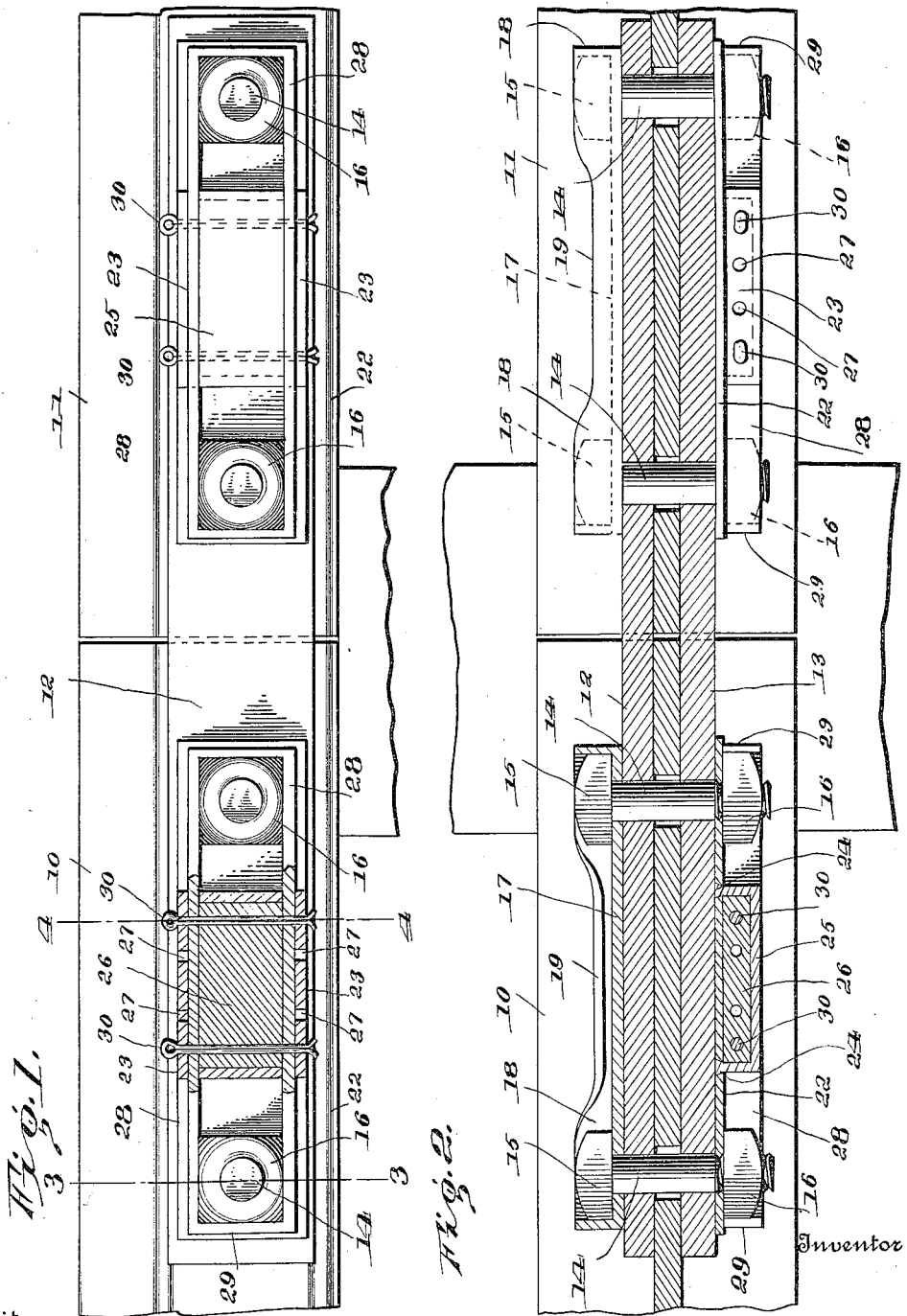

UNITED STATES PATENT OFFICE.

GEORGE W. FENSTEMAKER, OF AMBOY, ILLINOIS, ASSIGNOR OF ONE-HALF TO PETER O'CONNER, OF AMBOY, ILLINOIS.

LOCK-NUT.

1,064,629.

Specification of Letters Patent. Patented June 10, 1913.

Application filed June 4, 1912. Serial No. 701,639.

*To all whom it may concern:*

Be it known that I, GEORGE W. FENSTEMAKER, a citizen of the United States, residing at Amboy, in the county of Lee and State of Illinois, have invented certain new and useful Improvements in Lock-Nuts, of which the following is a specification.

This invention relates to improvements in lock nuts, and may be applied to nuts employed for various purposes, but is more particularly adapted for use in connection with the use of clamp bolts in railway rail joints, and has for one of its objects to simplify and improve the construction and increase the efficiency and utility of devices of this character.

With this and other objects in view, the invention consists in certain novel features of construction as hereafter shown and described.

As above stated, the improved device may be applied to nuts employed for various purposes, but for the purpose of illustration is shown applied to clamp bolts of a railway rail joint to which the device is peculiarly adapted, and in the drawings thus employed Figure 1 is a side elevation partly in section, of a conventional railway rail joint with the improvement applied to the nuts of the clamp bolts; Fig. 2 is a plan view partly in section of the parts shown in Fig. 1; Fig. 3 is a transverse section on the line 3—3 of Fig. 1; Fig. 4 is a transverse section on the line 4—4 of Fig. 1; Fig. 5 is a perspective view of the nut-engaging plate; Fig. 6 is a perspective view of the holding frame constructed to receive a hexagonal nut; Fig. 7 is a perspective view of the holding frame constructed to hold a square nut.

Corresponding and like parts are referred to in the following description and indicated in all the views of the drawings by the same reference characters.

In the drawings the rail ends are represented conventionally at 10—11, the fish plates at 12—13, the clamp bolts at 14 each having a head 15 at one end and a holding nut 16 on the other end, these parts being of the usual construction.

When bolts having the square heads 15 are employed, a holding device will be coupled to each contiguous pair of the bolts and comprising a plate 17 apertured to receive the bolts and with the edges and ends turned laterally into supporting flanges 18. The flanges thus closely engage the heads, and are preferably rolled over into parallel relations to the plate between the flanges as represented at 19 to increase the grip upon the bolt heads. Preferably the flanges 18 will be formed by cutting longitudinal clefts at the ends of the plate and bending the material at opposite sides of the clefts around the ends, as shown.

When bolts having rounded heads are employed, the holding plate 17 and its flanges 18 will not be required, as bolts of this character are provided with fins which enter sockets in the contiguous fish plate to prevent the rotation of the bolt. Bearing upon the opposite fish plate, is another plate 22 which is apertured to receive a contiguous pair of the bolts, preferably the same bolts which are engaged by the plate 18, and provided with laterally directed flanges 23 intermediate the ends. Riveted or otherwise secured at 24 to the plate 22, is a U-shaped member or stop 25 conforming substantially in outline to the flanges 23 and disposed between the same with spaces between the edges of the member 25 and the flanges 23, as shown. Located within the members 25, is a block 26 preferably of wood or like yieldable substance. The flanges 23 are provided with a plurality of apertures 27, while the block 26 is likewise provided with corresponding apertures, the apertures of the flanges 23 and of the block being thus in vertical alinement, as shown. Bearing over the nuts 16, is an oblong endless holding frame including spaced sides 28, and ends 29, with the sides 28 extending between the flanges 23 and the member 25. When the nuts 16 are of square form the ends 29 will be extended at right angles to the sides 28, as shown in Fig. 7, but when hexagonal nuts are employed, the ends 29 will be formed to correspond to the nuts, as shown in Fig. 6.

The sides 28 of the holding frames are provided with apertures to correspond to and adapted to be located in alinement with certain of the apertures 23 so that locking keys 30 may be inserted through the apertures and thus lock the frame to the plate 22. The keys will preferably be of the split form so that the sides may be distended to prevent accidental displacement.

It will thus be obvious that a simply constructed nut lock is produced which may be manufactured at small expense and operates effectually to prevent retrograde movement of the nut after being once set "home."

The wooden block 26 forms a slight grip upon the pins and likewise forms a guide to the pins.

Having thus described the invention, what is claimed as new is:

1. In a nut lock, a plate having bolt receiving apertures and lateral projections, a stop formed of a U-shaped member connected by its ends to the plate between the projections, an endless open frame engaging the plate and extending between the projections and the stop and adapted to bear over a plurality of nuts, and a plurality of keys extending through the projections of the frame and the stop.

2. In a nut lock, a plate having bolt-receiving apertures and lateral projections, a stop formed of a U-shaped member connected by its ends to the plate between the projections, a yieldable filling within said stop, an endless open frame engaging the plate and extending between the projections and the stop and adapted to bear over a plurality of nuts, and a plurality of keys extending through the projections, the frame and the stop and its filling.

In testimony whereof I affix my signature in presence of two witnesses.

GEORGE W. FENSTEMAKER. [L. S.]

Witnesses:
PETER C. CONNOR,
CHARLES W. RABBIT.

---

Copies of this patent may be obtained for five cents each, by addressing the "Commissioner of Patents, Washington, D. C."